(12) United States Patent
Ayata et al.

(10) Patent No.: US 10,267,071 B2
(45) Date of Patent: Apr. 23, 2019

(54) TAILGATE FOR A VEHICLE

(71) Applicant: Ford Global Technologies, LLC, Dearborn, MI (US)

(72) Inventors: Adnan Ayata, Kocaeli (TR); Gokhan Aldig, Kocaeli (TR); Emre Turker, Istanbul (TR); Ozkan Yilmaz, Istanbul (TR)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/831,826

(22) Filed: Dec. 5, 2017

(65) Prior Publication Data

US 2018/0187462 A1    Jul. 5, 2018

(30) Foreign Application Priority Data

Dec. 30, 2016    (EP) .................................... 16207498

(51) Int. Cl.
| | |
|---|---|
| *B60N 3/02* | (2006.01) |
| *E05B 85/12* | (2014.01) |
| *B60J 5/10* | (2006.01) |
| *E05B 83/18* | (2014.01) |
| *E05B 1/00* | (2006.01) |
| *B60R 13/02* | (2006.01) |

(52) U.S. Cl.
CPC ................ *E05B 85/12* (2013.01); *B60J 5/10* (2013.01); *B60N 3/023* (2013.01); *E05B 1/0015* (2013.01); *E05B 83/18* (2013.01); *B60R 13/0243* (2013.01)

(58) Field of Classification Search
CPC ............ B60N 3/023; B60N 3/02; E05B 85/12
See application file for complete search history.

(56) References Cited

U.S. PATENT DOCUMENTS

| | | | | |
|---|---|---|---|---|
| 3,234,583 A | * | 2/1966 | Kempel .................... | E05F 9/00 16/442 |
| 6,385,816 B1 | * | 5/2002 | Baldas ................... | B60N 3/023 16/4 |
| 7,631,915 B2 | | 12/2009 | Browne et al. | |
| 8,141,933 B2 | | 3/2012 | Nakamura | |
| 8,684,435 B1 | * | 4/2014 | Lee .......................... | E05B 81/06 16/110.1 |
| 8,726,467 B1 | * | 5/2014 | Smith .................. | B65H 75/425 16/412 |

(Continued)

FOREIGN PATENT DOCUMENTS

| | | |
|---|---|---|
| DE | 3018060 A1 | 11/1981 |
| DE | 29920826 U1 | 2/2000 |

(Continued)

OTHER PUBLICATIONS

KR101856247B1 google machine translation (Year: 2018).*

*Primary Examiner* — Hilary L Gutman
(74) *Attorney, Agent, or Firm* — Vichit Chea; Price Heneveld LLP

(57) ABSTRACT

A tailgate for a vehicle has a handle having a handle portion for a user and a connection portion connected to an inside surface of the tailgate. In order to provide a tailgate that allows for an ergonomic operation by users having different body heights, the connection portion is movable along the inside surface between first and second positions, the second position being lower than the first position in an open position of the tailgate.

17 Claims, 2 Drawing Sheets

(56) References Cited

U.S. PATENT DOCUMENTS

| | | | |
|---|---|---|---|
| 2001/0042995 A1 | 11/2001 | Kim | |
| 2016/0208517 A1* | 7/2016 | Dargel | E05B 17/20 |
| 2016/0312501 A1* | 10/2016 | Lee | E05B 85/12 |
| 2018/0111455 A1* | 4/2018 | Felix Frias | B60J 5/106 |
| 2018/0258679 A1* | 9/2018 | Topolovec | B60J 5/101 |

FOREIGN PATENT DOCUMENTS

| | | | |
|---|---|---|---|
| DE | 202013102552 U1 | 8/2013 | |
| DE | 202014003662 U1 | 8/2015 | |
| KR | 20020051745 A * | 6/2002 | |
| KR | 20140023603 A * | 2/2014 | |
| KR | 1020150073790 A | 7/2015 | |
| KR | 101856247 B1 * | 5/2018 | |
| WO | 2010109083 A1 | 9/2010 | |
| WO | WO-2010109083 A1 * | 9/2010 | B60N 3/023 |

* cited by examiner

TAILGATE FOR A VEHICLE

FIELD OF THE INVENTION

The present invention generally relates to a tailgate for a vehicle, and more particularly relates to a vehicle tailgate handle arrangement.

BACKGROUND OF THE INVENTION

Vehicles like passenger cars normally have a trunk or cargo area, which can be closed by at least one back door that is hingedly connected to the car body. Such a back door may also be referred to as a luggage compartment door, hatch, hatch door or tailgate. In some cases, a door may be hinged at the side or at the bottom. Usually the door is hinged at the top. Normally, the hinges are positioned above a rear window and when loading or unloading cargo, a user can stand underneath the open door. A handle is usually disposed on the inside of the rear door, which handle can be grasped by a user in order to close the rear door. On the one hand, it is desirable that the back door opens wide enough to provide enough space for a user. On the other hand, as the door is opened wider, it may be difficult, especially for a short person, to reach the handle.

It is possible to make the handle longer so that it extends further downwards. Also, the handle can be movable between a retracted position and an extended position. However, both solutions can lead to problems, especially when the rear door is in or near the closed position, because the handle may interfere with body parts of the user or with cargo stored in the vehicle.

U.S. Pat. No. 7,631,915 B2 discloses a self-actuating device for a handle inside a vehicle interior on a vehicle tailgate. The device includes a member in physical communication with a vehicle surface, and an active material in operable communication with the member. The active material undergoes a change in at least one property upon receipt of an activation signal, whereupon the member changes its form. A detent mechanism maintains the member in one of a first form and a second form when the activation signal is discontinued.

U.S. Pat. No. 8,684,435 B1 discloses a tailgate with a handle structure. A handle is connected to the tailgate by two pairs of telescoping cylinders, which are actuated by a motor. The motor is activated when a sensor connected to the tailgate hinge senses that the tailgate is being closed or opened. This leads to the handle being retracted or extended. A spring element is disposed in each cylinder, which prestresses the handle to an extended position, while the motor exerts a pulling force towards the retracted position.

U.S. Pat. No. 6,385,816 B1 discloses a handle assembly in combination with a lift gate. The handle assembly comprises a handle having a grip section and two legs extending from the grip section, a pocket secured to an inside panel of the lift gate, the two legs of the handle being pivotally secured to two sides of the pocket. In a stowed position of the handle, the grip section is retained within the pocket, while in an extended position, the grip section is extended from the pocket. The handle is retained in the stowed position by gravity when the lift gate is closed and being shifted to the extended position by gravity when the lift gate is opened.

WO 2010/109083 A1 discloses a vehicle tailgate comprising on the inner surface a handle that is mobile, when the tailgate is opened, between a retracted position and an extended position by means of a control mechanism. The handle is a lever pivotably mounted on the inner surface and the control mechanism includes a cable comprising a spooled first end that is attached onto a first stationary pulley for attachment onto a portion that is stationary relative to the vehicle body, and a second end being spooled and attached onto a second pulley that is rotatably mounted on the pivotal movement axis of the lever. Thus, the cable can be spooled onto the first pulley and unspooled from the second pulley when the tailgate is opened while pivoting the lever between the retracted position and the extended position.

KR 20150073790 A discloses a device for drawing out a tailgate handle. The device comprises a housing mounted on a tailgate, wherein a cylinder extends vertically, a pair of sliding pistons are disposed in the cylinder, and two opposing sides of a handle are connected to the pistons. An operation module of the device has a drive motor driven when the tailgate is opened and closed to provide a rotational force and a gear unit, which is connected to the drive motor, operates the pistons. A stopper apparatus is arranged is configured to fix a position of the handle by restricting rotation of the gear unit.

DE 20 2013 102 552 A1 discloses a movable handle assembly for an inner surface of a column of a vehicle. The assembly comprises a slot which is formed on a surface of the vehicle interior, which slot has a bottom. An alignment plate is disposed on the bottom and a handle is slidingly mounted in the slot, which handle comprises a button. A locking element is connected to the handle and comprises a movable bolt which is connected to the button, whereby the button can be used to lock or to release the alignment plate.

U.S. Pat. No. 8,141,933 B2 discloses a tailgate having a pull pocket on which a hand is put when the door is manipulated. The tailgate includes a door panel, a lining and a pull pocket member. The lining is provided over an inside of the door panel facing toward a vehicle cabin when the door is mounted to a vehicle body. The pull pocket member is formed independently of the lining and mounted to the lining. It includes a recessed portion which is recessed toward the door panel and configured to form an undercut at a face of the lining that faces towards the vehicle cabin when the pull pocket member is mounted to the lining.

In light of the above-mentioned prior art, provision of an improved tailgate which can be operated ergonomically by tall and short users as well, still offers room for improvement. In particular, it is desirable that the handle of such a tailgate allows for a compact and simple configuration. It is therefore desirable to provide a tailgate that allows for an ergonomic operation by users having different body heights.

SUMMARY OF THE INVENTION

According to one aspect of the present invention, a tailgate for a vehicle with a handle is provided. The tailgate for a vehicle with a handle includes a handle portion for a user, and a connection portion connected to an inside surface of the tailgate, wherein the connection portion is movable along the inside surface between a first position and a second position, the second position being lower than the first position in an open position of the tailgate.

According to another aspect of the present invention, a vehicle tailgate with a handle is provided. The vehicle tailgate with a handle includes a handle portion for a user, a connection portion connected to an inside surface of the tailgate, wherein the connection portion is movable along the inside surface between a first position and a second position, the second position being lower than the first position in an open position of the tailgate, and at least one rail disposed on the inside surface, wherein the connection portion slidably engages the at least one rail.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
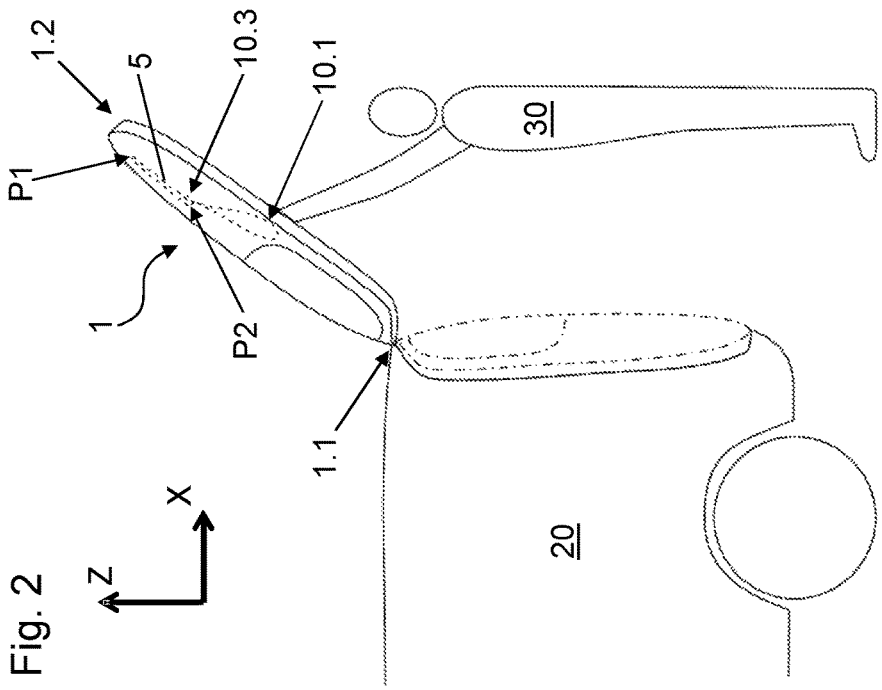
FIG. 1 is a perspective view of a tailgate in a closed position and having a multiple position handle.

In the various figures, like parts are always associated with the same reference numerals, wherefore they are usually depicted only once.

Figure 2:
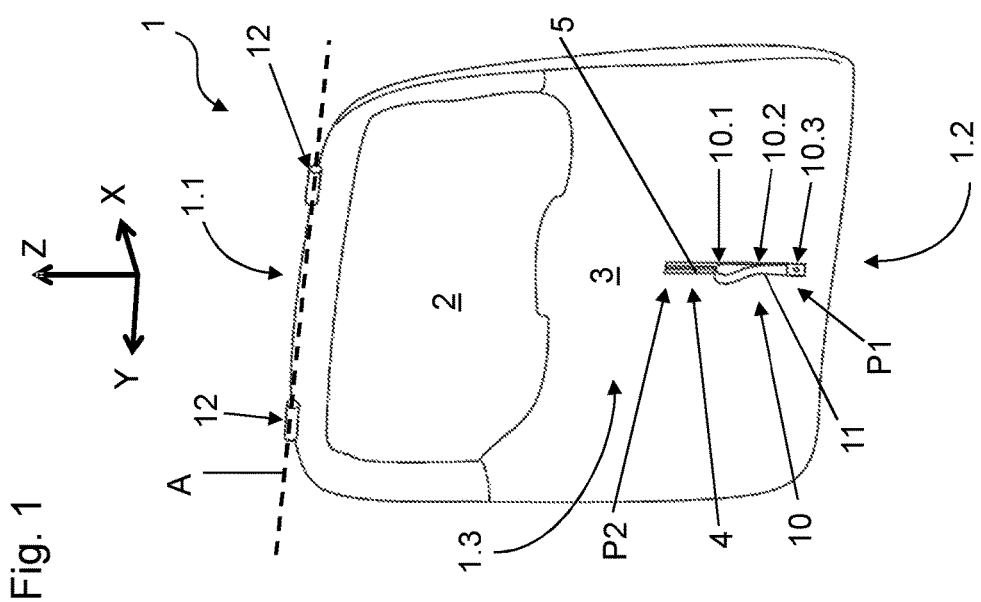
FIG. 2 is a side view of a vehicle with the tailgate of FIG. 1 in a closed position and in an open position.

FIG. 1 shows a perspective view of an inventive tailgate 1 which may be used, for example, for the trunk of a vehicle 20 like a van or a minivan. The tailgate 1 is shown in a closed position, while the rest of the vehicle 20 is omitted for the sake of clarity. In this closed position, which is also shown in FIG. 2 with dash-dotted lines, the tailgate 1 extends almost vertically downwards from a hinge side 1.1 to a lock side 1.2. On the hinge side 1.1, two hinges 12 of a hinge mechanism are connected to the tailgate 1, whereby the tailgate 1 is connectable to a body of the vehicle 20. The hinges allow for a pivot movement about a hinge axis A. The tailgate 1 also includes a rear window 2 near the hinge side 1.1. A handle 10 is disposed adjacent an inside surface 1.3 of the tailgate 1. In particular, a slot 4 is provided in a trim panel 3, wherein a rail 5 is mounted inside the slot 4. A connection portion 10.3 of the handle 10 engages the rail 5 to be slidingly movable along the rail 5. A handle portion 10.1, which can be grasped by a user 30, is connected to the connection portion by an intermediate portion 10.2. In the embodiment shown, the handle portion 10.1 and the intermediate portion 10.2 are formed as a single piece as part of a flexible hand strap 11. The hand strap 11 may be made of flexible plastic material. As can be seen in FIG. 1, the hand strap 11 is sufficiently stiff that it extends upwards adjacent the inside surface. Thus, it assumes a space-saving position and does not interfere with any cargo stored in the trunk of the vehicle. In particular, at least a part of the hand strap 11 may be stored inside the slot 4.

In FIG. 1, the connection portion 10.3 is in a first position P1 near a first end of the rail 5. However, by sliding along the rail 5, the connection portion 10.3 can be moved to a second position P2 near a second end of the rail 5. In this closed position, the first position P1 is lower than the second position P2. The connection portion 10.3 may move automatically to the first position driven by gravity. For instance, if the total weight coupled to the connection portion 10.3 (the weight of the handle portion 10.1, the intermediate portion 10.2 the connection portion 10.3 and optionally an additional weight) may be greater than frictional forces between the connection portion 10.3 and the rail 5. However, other mechanisms are possible, for instance the connection portion 10.3 may be driven by an actuator which is coupled to a sensor that senses whether the tailgate is in the closed position. Also, the connection portion 10.3 could be coupled to the hinges 12 via a force transfer mechanism which transfers a force so that the connection portion 10.3 is moved to the first position P1 when the tailgate 1 is closed. In addition to forces applied by weight, by a force transfer mechanism or by an actuator, the connection portion may be elastically biased towards the first position P1 or the second position P2. Finally, it is conceivable that the connection portion 10.3 does not move automatically but may be positioned by the user 30 in the first position. In this case, the connection portion 10.3 may comprise some kind of locking mechanism that prevents unintentional movement.

FIG. 2 illustrates the tailgate 1 being moved from the closed position to an open position, which corresponds to a rotation of about 150°. While the hinge side 1.1 more or less maintains its position, the lock side 1.2 moves from the height of, for example, about 40 cm above ground to, for example, about 2 m or more, which is well above the head of the user 30 standing behind the vehicle. For a short person, it would be difficult or even impossible to reach the handle portion 10.1 if the connection portion 10.3 remains in the first position P1. Now, the second position P2 is lower than the first position P1. If the movement of the connection portion 10.3 is gravity-driven, it will move automatically to the second position P2, which puts the handle portion about 20 to 30 cm lower, in one example, and therefore easier to reach for a short person. Alternatively, as mentioned above, the connection portion 10.3 may be moved to the second position by an actuator or by a force transfer mechanism. Also, the movement to the second position may be either assisted or dampened by an elastic biasing force applied to the connection portion 10.3. If there is no mechanism for automatically moving the connection portion 10.3 to the second position P2, the user 30 may manually move it to the second position P2, normally before fully opening the tailgate 1.

Figure 3:
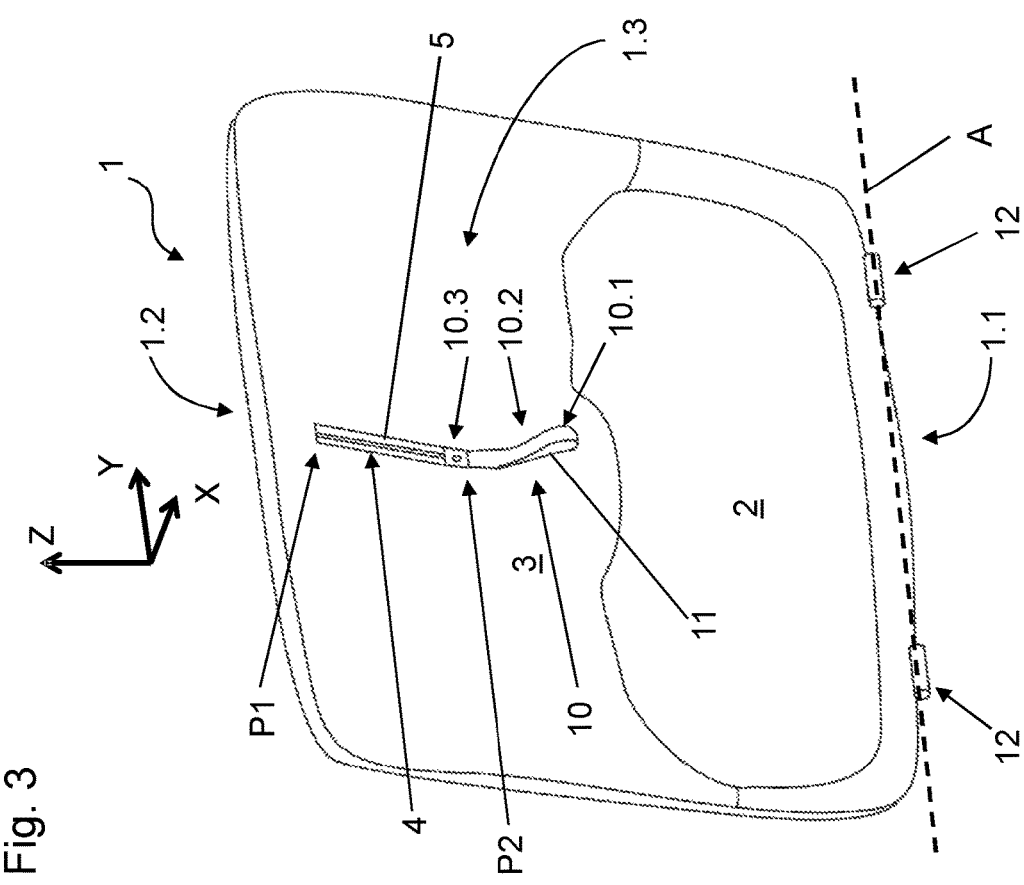
FIG. 3 is a perspective view of the tailgate of FIG. 1 in the open position.

FIG. 3 shows a perspective view of the tailgate 1 in the open position with the connection portion 10.3 in the second position P2 near the second end of the rail 5. By comparing FIGS. 1 and 3, it can be seen that the handle portion 10.1 is moved from a position approximately halfway between the lock side 1.2 and the rear window 2 into a position adjacent the rear window 2. However, since the distance between the connection portion 10.3 at the handle portion 10.1 is constant and the position change is due to the movement of the connection portion 10.3, the entire handle 10 stays near the inside surface 1.3 instead of hanging further down and possibly interfering with body parts of the user 30. In order to close the tailgate 1, the user 30 grasps the handle portion 10.1 and pulls it downwards. As the tailgate 1 is closed, the connection portion 10.3 may automatically move back to the first position shown in FIG. 1.

It should be noted that features and measures that are mentioned individually in the following description may be combined in any technically reasonable way and point out further embodiments of the invention. The description further characterizes and specifies the tailgate, in particular in context with the figures.

The present disclosure provides a tailgate for a vehicle. The vehicle is normally a passenger car, e.g., a limousine, an SUV, a van, a minivan or the like. Herein, "tailgate" includes every kind of back door used to close a rear cargo area of the vehicle. It may also be referred to as, e.g., a luggage compartment door, hatch or hatch door. Preferably, the tailgate is hinged connected to a car body at its top. It may comprise at least one rear window. The tailgate has a handle having a handle portion for a user and a connection portion connected to an inside surface of the tailgate. The handle may be any element that the user can grasp in order to operate the tailgate, in particular for closing the tailgate. The handle may be made as a single piece or of several pieces, which may be rigidly or movably connected with each other. The handle has a handle portion, which is the portion that is designed for being grasped by the user. A connection portion of the handle is connected to the inside surface of the tailgate. "Inside surface" refers to any surface facing or in communication with the inside of the vehicle when the tailgate is closed. The connection portion is at least partially disposed on or adjacent the inside surface. It is understood that the mechanical stability of the handle and the connection between the connection portion and the inside surface are designed to withstand any forces typically occurring when the user closes the tailgate.

According to one embodiment, the connection portion is movable along the inside surface between a first position and a second position, the second position being lower than the first position in an open position of the tailgate. "Lower" herein refers to the fully assembled state of the tailgate on a vehicle with the vehicle is standing on a horizontal surface. The open position of course corresponds to the state where the tailgate is opened. In particular, it may correspond to the fully opened or maximum opened state of the tailgate. In this open position, a hinge side of the tailgate may be positioned lower than a lock side. The connection portion is not fixedly connected to the inside surface, but it is movable along the surface. In other words, as the connection portion is moved, it remains at the inside surface or adjacent the inside surface. This on the other hand means that the handle extends from the inside surface by a more or less constant distance, no matter if it is in the first position, in the second position or in an intermediate position. Therefore, in either position it does not have to extend excessively from the inside surface, wherefore interference with body parts of the user and/or cargo inside the vehicle can be reduced to a minimum. However, since the second position is lower than the first position in the open position of the tailgate, the connection portion is disposed lower when it is in the second position. Therefore, even if the distance and/or the relative position between the handle portion and the connection portion remains the same, the handle portion may be disposed lower and thus may be easier to reach by a short person.

There are different ways of connecting the connection portion with the inside surface so that it is movable as described above. For instance, the connection portion could comprise a spindle nut engaging a spindle provided at the inside surface. According to another embodiment, the connection portion slidably engages at least one rail disposed on the inside surface. This may be a single, one-part rail, but also includes several rails and/or a rail comprising two or more parts. The connection portion may comprise a carriage or the like that engages the at least one rail. There are numerous possibilities for the cross-section of the connection portion and the at least one rail, respectively. Normally, the connection portion engages the at least one rail so that any movement perpendicular to the rail is prevented or at least limited.

Preferably, the handle portion is spaced from the connection portion by an intermediate portion. Such an intermediate portion may be elongate to increase the distance between the handle portion and the connection portion. In the open position, this normally helps to place the handle portion as low as possible, making it easier for a short person to reach it. The intermediate portion and the handle portion may be at least partially made as a single piece. The same applies to the intermediate portion of the connection portion.

In particular, but not exclusively, when such an intermediate portion is present, the handle portion may be flexibly connected to the connection portion. In particular, the intermediate portion and/or the handle portion may at least partially be made of a flexible material like plastic, rubber, leather or fabric.

The handle may comprise a flexible hand strap. Such a hand strap may comprise the handle portion as well as the intermediate portion. In this case, the handle portion may not be clearly distinguishable from the intermediate portion, but normally the handle portion would be regarded as the end of the hand strap facing away from the connection portion. In one embodiment, the hand strap is sufficiently stiff that it maintains a position adjacent the inside surface (as long as a user does not apply any force).

While the connection portion may be movable between the two positions, e.g., along an arcuate path, it may be preferred that the connection portion is configured for linear movement. In other words, it moves from the first position to the second position (and vice versa) along a straight path. In an embodiment with a rail disposed on the inside surface, such a rail would be straight. If the path is not completely straight, it may be preferred, though, that it runs along the X-Z-plane of the vehicle.

It is possible that the connection portion is moved manually to the second position. For example, the connection portion could be lockable in the second position so that a user could move it to and lock it in this position, thereby benefiting from a permanently lower position of the handle when the tailgate is opened. Alternatively, the connection portion may be configured to automatically move to the second position when the tailgate moves to the open position. "Automatically" herein means that if the tailgate moves (or is moved) to the open position, the connection portion moves to the second position without intervention by the user. This includes the possibility that the movement of the connection portion and the movement of the tailgate occur simultaneously or one after another. In such an embodiment, the connection portion (and therefore the handle) can always be found in the lower position when the tailgate is opened, even if it is in the first position (or an intermediate position) before the tailgate is opened. Thus, a short user will always find the handle in the optimum position when the tailgate is opened, while a lower positioning of the handle is usually not a drawback for a tall user.

Normally, the first position is lower than the second position in a closed position of the tailgate. For example, the inside surface may be inclined downwards (towards the rear of the vehicle) in the closed position, while it is inclined upwards in the open position. This corresponds to a common design of many tailgates.

Especially if it is configured to automatically move to the second position, it may be preferred that the connection portion is configured to automatically move to the first position when the tailgate moves to the closed position. Here again, the two movements may occur simultaneously or one after another. This embodiment may be advantageous, e.g., if the handle might block the view through a rear window of the vehicle if it remains in the second position or if it assumes a space-saving position when the connection portion is in the first position. For example, at least a part of the handle may be placed in a recessed portion of the inside surface.

The automatic movement may be achieved in different ways. According to one embodiment, the connection portion is configured to move to at least one of the first and second positions driven by gravity. It is understood that if the connection portion can slide between the first and the second positions and the total weight force acting on the connection portion (or rather the component acting in the direction of motion, e.g., given by a rail) exceeds the frictional forces, the connection portion moves to the second position following the force of gravity. The same applies to the movement to the first position if the first position is lower than the second position when the tailgate is in the closed position. This embodiment is advantageous in that it can be realised in a simple way without the need for complicated mechanisms or energy sources.

According to another embodiment, an actuator is configured to move the connection portion between the first and second positions. Such an actuator may be operated electrically and may be coupled to a sensor which senses the position of the tailgate. It is understood that the actuator may be coupled to a gear which acts on the connection portion.

Alternatively or additionally to a gravity-driven movement or an actuator-driven movement, the connection portion may be elastically biased towards one of the first and second positions. In other words, an elastic member like a spring may be coupled between the connection portion and the inside surface, thereby exerting a biasing force on the connection portion. Depending on the direction of this force, it may either assist or dampen the movement towards the first position or second position.

Also, it is conceivable that the connection portion is mechanically coupled to a hinge mechanism of the tailgate. The hinge mechanism allows for the movement of the tailgate between the open position and the closed position. In other words, a mechanical force may be transferable from the hinge mechanism to move the connection portion to at least one of the first and second positions. In this case, the connection portion may be connected to the hinge mechanism via a force transfer mechanism so that when the tailgate is opened, a force is transferred to the connection portion which moves it to the second position. When the tailgate is closed, the connection portion may either be moved by a transfer mechanism or by a biasing spring as described above. Likewise, it is possible that the first transfer mechanism only transfers a force for moving the connection portion to the first position, while movement to the second position is achieved via a biasing spring.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A tailgate for a vehicle with a handle comprising:
   a handle portion for a user;
   a connection portion connected to an inside surface of the tailgate, wherein the connection portion is movable along the inside surface between a first position and a second position, the second position being lower than the first position in an open position of the tailgate; and
   at least one rail disposed on the inside surface, wherein the connection portion slidably engages the at least one rail, and wherein the handle portion is flexibly connected to the connection portion.

2. The tailgate according to claim 1, wherein the handle portion is spaced from the connection portion by an intermediate portion.

3. The tailgate according to claim 1, wherein the handle comprises a flexible hand strap.

4. The tailgate according to claim 1, wherein the connection portion is configured for linear movement.

5. The tailgate according to claim 1, wherein the connection portion is configured to automatically move to the second position when the tailgate moves to the open position.

6. The tailgate according to claim 1, wherein the first position is lower than the second position in a closed position of the tailgate.

7. The tailgate according to claim 1, wherein the connection portion is configured to automatically move to the first position when the tailgate moves to a closed position of the tailgate.

8. The tailgate according to claim 1, wherein the connection portion is configured to move to at least one of the first and second positions driven by gravity.

9. The tailgate according to claim 1, wherein an actuator is configured to move the connection portion between the first and second positions.

10. The tailgate according to claim 1, wherein the connection portion is elastically biased towards one of the first and second positions.

11. The tailgate according to claim 1, wherein a mechanical force may be transferable from a hinge mechanism of the tailgate to move the connection portion to at least one of the first position and second position.

12. A vehicle tailgate with a handle comprising:
    a handle portion for a user;
    a connection portion connected to an inside surface of the tailgate, wherein the connection portion is movable along the inside surface between a first position and a second position, the second position being lower than the first position in an open position of the tailgate; and
    at least one rail disposed on the inside surface, wherein the connection portion slidably engages the at least one rail, and wherein the handle comprises a flexible hand strap.

13. The tailgate according to claim 12, wherein the handle portion is spaced from the connection portion by an intermediate portion.

14. The tailgate according to claim 12, wherein the handle portion is flexibly connected to the connection portion.

15. The tailgate according to claim 12, wherein the connection portion is configured for linear movement.

16. The tailgate according to claim 12, wherein the connection portion is configured to automatically move to the second position when the tailgate moves to the open position.

17. The tailgate according to claim 12, wherein an actuator is configured to move the connection portion between the first and second positions.

* * * * *